US009067662B2

(12) United States Patent
Sako et al.

(10) Patent No.: US 9,067,662 B2
(45) Date of Patent: Jun. 30, 2015

(54) ATMOSPHERIC PRESSURE ESTIMATION DEVICE OF OUTBOARD MOTOR

(71) Applicant: Mitsubishi Electric Corporation, Chiyoda-ku, Tokyo (JP)

(72) Inventors: Hitoshi Sako, Kobe (JP); Yohei Yamaguchi, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 14/149,920

(22) Filed: Jan. 8, 2014

(65) Prior Publication Data

US 2015/0066256 A1 Mar. 5, 2015

(30) Foreign Application Priority Data

Aug. 29, 2013 (JP) ................................ 2013-177517

(51) Int. Cl.
*B60L 3/00* (2006.01)
*B63H 21/21* (2006.01)
*B63H 20/00* (2006.01)
*F02N 1/00* (2006.01)

(52) U.S. Cl.
CPC ................ *B63H 21/21* (2013.01); *B63H 20/00* (2013.01); *F02N 1/00* (2013.01)

(58) Field of Classification Search
CPC ....... F02N 19/00; F02N 1/00; F02N 11/0848; B63H 20/00; F02D 41/04; F02M 37/20; F02B 61/045
See application file for complete search history.

(56) References Cited

U.S. PATENT DOCUMENTS

| | | | | |
|---|---|---|---|---|
| 4,951,647 | A | 8/1990 | Ezumi et al. | |
| 6,425,362 | B1 * | 7/2002 | Kanno | 123/179.16 |
| 8,734,194 | B2 * | 5/2014 | Takewaki et al. | 440/88 F |
| 2002/0189595 | A1 | 12/2002 | Iwasaki | |
| 2006/0185656 | A1 | 8/2006 | Miyauchi et al. | |
| 2011/0276254 | A1 | 11/2011 | Tsukamoto et al. | |
| 2013/0178119 | A1 * | 7/2013 | Takewaki et al. | 440/88 F |
| 2013/0178120 | A1 * | 7/2013 | Takewaki et al. | 440/88 F |
| 2013/0247857 | A1 * | 9/2013 | Yamazaki et al. | 123/179.3 |
| 2013/0247878 | A1 * | 9/2013 | Shomura et al. | 123/472 |

FOREIGN PATENT DOCUMENTS

| | | | |
|---|---|---|---|
| JP | 01-280661 | A | 11/1989 |
| JP | 07-180596 | A | 7/1995 |
| JP | 2002-371894 | A | 12/2002 |

(Continued)

OTHER PUBLICATIONS

Japanese Office Action (Notification of Reasons for Refusal), issued May 27, 2014 in Patent Application No. 2013-177517.

*Primary Examiner* — Behrang Badii
(74) *Attorney, Agent, or Firm* — Sughrue Mion, PLLC

(57) ABSTRACT

By obtaining an atmospheric pressure learning value by applying filtering to an estimated atmospheric pressure found from an estimated atmospheric pressure map in an atmospheric pressure learning region matched in advance, and by constantly updating this atmospheric pressure learning value, stable and highly reliable atmospheric pressure estimation can be achieved. Also, a pre-set parameter value or the last atmospheric pressure learning value is used as the initial atmospheric pressure value and an unstable intake pressure value at the engine start in a battery-less state is not used. Hence, it becomes possible to provide an estimated atmospheric pressure with which high drivability is achievable by fully exploiting the engine performance as soon as the engine is started.

12 Claims, 11 Drawing Sheets

(56) References Cited

FOREIGN PATENT DOCUMENTS

| | | | |
|---|---|---|---|
| JP | 2006-226235 | A | 8/2006 |
| JP | 2007-046549 | A | 2/2007 |
| JP | 2013-087668 | A | 5/2013 |
| WO | 2010/090060 | A1 | 8/2010 |

* cited by examiner

ATMOSPHERIC PRESSURE ESTIMATION DEVICE OF OUTBOARD MOTOR

BACKGROUND OF THE INVENTION

1. Field of the Invention

The present invention relates to an atmospheric pressure estimation device that estimates an atmospheric pressure, which is an engine control parameter, in an outboard motor for small boat unequipped with a battery and configured to start an engine by manually rotating a crankshaft.

2. Description of the Background Art

A fuel supply by a calibrator method is the mainstream for an outboard motor for small boat of a small piston displacement. Normally, the outboard motor is not equipped with a battery or a starter but provided with a recoil starting device to start the engine manually by a ship driver, so that the outboard motor is formed to be lightweight and at low costs.

The fuel supply method of an outboard motor for small boat of a small piston displacement is now also changing from carburetor to electronic control with the aim of enhancing the ease of operation and maintenance as well as an output performance and addressing an emission gas issue. Nevertheless, in order to form a compact, light, inexpensive engine, a starting device, such as a starter, and a battery are often omitted.

Also, an amount of intake air to the engine varies with an atmospheric pressure and it is therefore necessary to control the engine according to an atmospheric pressure. It is, however, preferable for an outboard motor for small boat of a small piston displacement to reduce the number of sensors used to calculate control parameters to the least extent possible. To this end, an atmospheric pressure sensor is often omitted, and an atmospheric pressure is estimated instead on the basis of information from other sensors, such as intake pressure sensor and a throttle sensor, and an operation state, so that the estimated atmospheric pressure is used as a control parameter.

In the related art, Patent Document 1 proposes a method of estimating an atmospheric pressure, by which means for detecting an amount of air taken into the engine is used, so that a calculation value and an actual measured value of an amount of intake air to the engine are controlled to be equal using an intake pressure sensor, a throttle sensor, an operation state of the engine, and the estimated atmospheric pressure value.

[Patent Document 1] WO 2010-090060

As described above, in the atmospheric pressure estimation device in an outboard motor for small boat unequipped with a battery and configured to manually rotate the crankshaft so that an electronic control unit is activated with power generated by the rotation to start and control the engine, the electronic control unit is activated while the engine is in operation. Also, the power supply of the electronic control unit is immediately turned OFF when the engine stops because generated power is no longer supplied.

Hence, immediately after the electronic control unit is activated, the engine is already driven and so-called an engine stall state does not occur. An intake pressure value at the engine start is unstable and is not equal to an atmospheric pressure. It is therefore difficult to estimate an atmospheric pressure in a stable manner from the intake pressure value found by the intake pressure sensor immediately after the electronic control unit is activated.

SUMMARY OF THE INVENTION

The invention was devised to solve the problems discussed above and has an object to provide an atmospheric pressure estimation device that is highly reliable and capable of estimating an atmospheric pressure in a stable manner in an outboard motor unequipped with a battery and configured to start an engine by manually rotating a crankshaft.

An atmospheric pressure estimation device according to an aspect of the invention is an atmospheric pressure estimation device of an outboard motor unequipped with a battery and configured to start an engine by manually rotating a crankshaft, including: an electronic control unit that controls the engine; an operation state detection portion that detects an operation state of the engine; an intake pressure detection portion that detects an intake pressure of the engine; and a throttle opening detection portion that detects opening of an intake metering valve of the engine. The electronic control unit performs: processing to match a throttle full-open value at every engine rotation speed calculated from a rotation speed of the engine using the intake pressure and set the matched value in a throttle full-open map; processing to determine an atmospheric pressure learning region on the basis of the throttle full-open value found from the throttle full-open map and a value of actual throttle opening; processing to match an estimated atmospheric pressure using an average intake pressure calculated by the intake pressure detection portion and set the matched value in an estimated atmospheric pressure map; and processing to obtain an atmospheric pressure learning value by applying filtering to the estimated atmospheric pressure found from the estimated atmospheric pressure map in the atmospheric pressure learning region and update the atmospheric pressure learning value at predetermined intervals.

According to the atmospheric pressure estimation device of an outboard motor of the invention configured as above, by obtaining an atmospheric pressure learning value by applying filtering to an estimated atmospheric pressure value found from the estimated atmospheric pressure map in the atmospheric pressure learning region matched in advance, and by updating this atmospheric pressure learning value at predetermined intervals, stable and highly reliable atmospheric pressure estimation can be achieved.

The foregoing and other objects, features, aspects and advantages of the present invention will become more apparent from the following detailed description of the present invention when taken conjunction with the accompanying drawings.

DETAILED DESCRIPTION OF THE PREFERRED EMBODIMENT

First Embodiment

Figure 1:
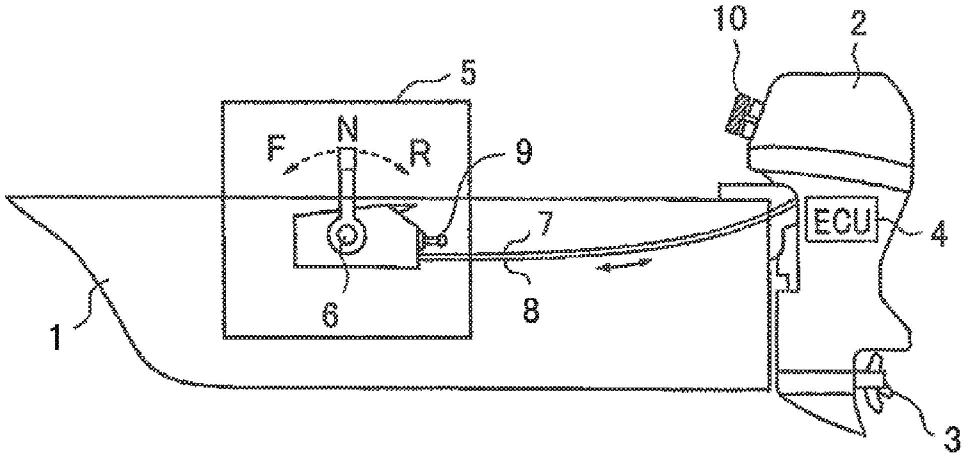
FIG. 1 is a view used to describe an overall configuration when an atmospheric pressure estimation device according to a first embodiment of the invention is applied to an internal combustion engine for ship.
Figure 2:
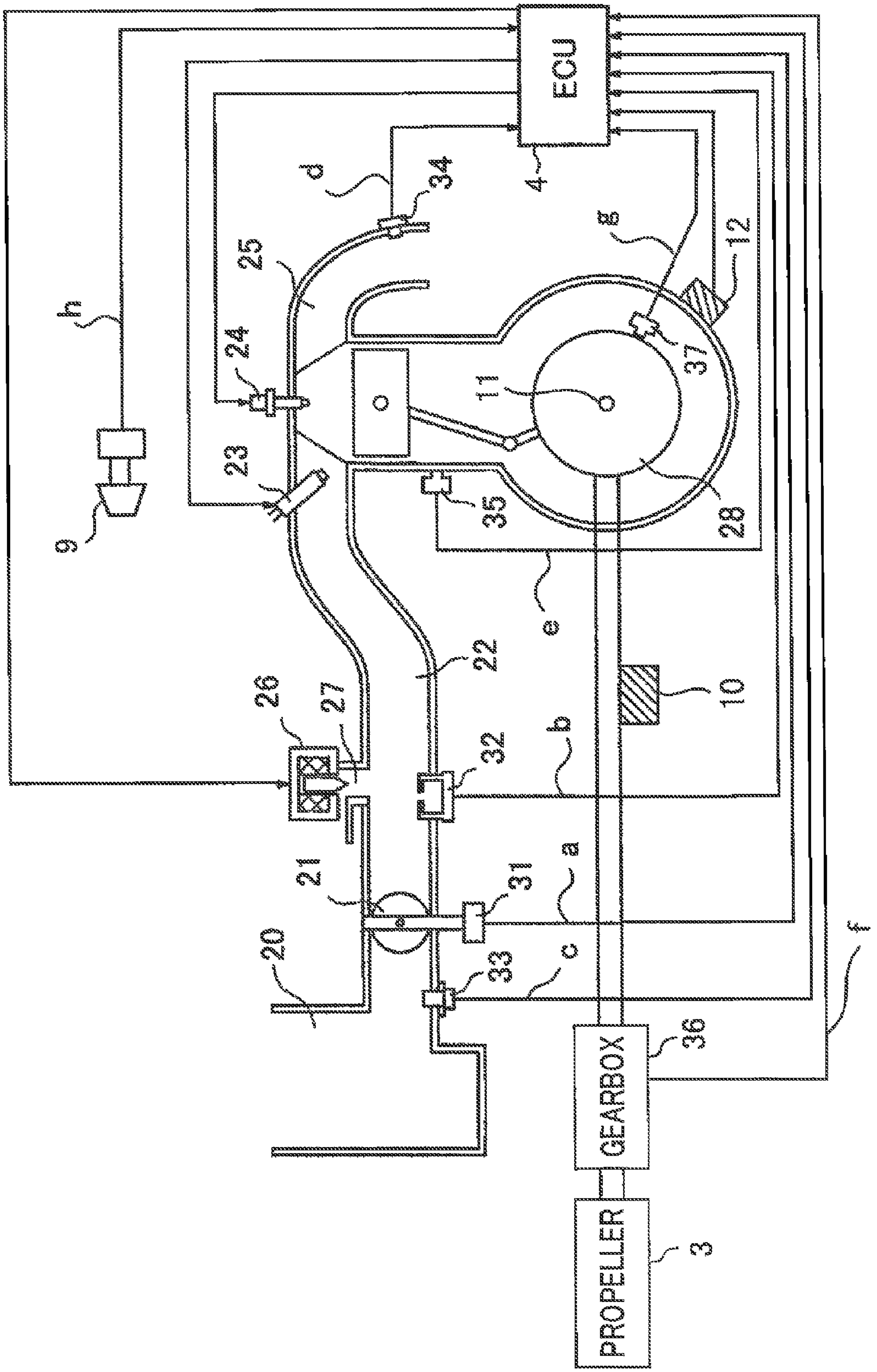
FIG. 2 is a view used to describe a configuration of an internal combustion engine equipped with the atmospheric pressure estimation device according to the first embodiment of the invention.

Hereinafter, an atmospheric pressure estimation device of an outboard motor according to a first embodiment of the invention will be described according to the drawings. FIG. 1 is a view used to describe an overall configuration when the atmospheric pressure estimation device of the first embodiment is applied to an internal combustion engine for ship. FIG. 2 is a view used to describe a configuration of an internal combustion engine equipped with the atmospheric pressure estimation device of the first embodiment. Same or equivalent portions are labeled with same reference numerals in the respective drawings.

The atmospheric pressure estimation device of the first embodiment is a device that estimates an atmospheric pressure as an engine control parameter in an outboard motor for small boat, which is not equipped with a battery and configured to start the engine by manually rotating a crankshaft 11 so as to start an electronic control unit 4 (hereinafter, abbreviated to ECU 4) that controls the engine with power generated by the rotation.

As is shown in FIG. 1, an outboard motor including an engine 2 as an internal combustion engine, a shaft (not shown), a propeller 3, and so on combined in one unit is provided with the ECU 4 as a control portion and attached to the stern of a ship (small boat) 1. A throttle lever 6 is provided in a ship cockpit 5 and the throttle lever 6 regulates an opening of a throttle valve 21 (see FIG. 2), that is, an amount of intake air, via a throttle cable 7 by way of a link mechanism (not shown) in the outboard motor.

The throttle lever 6 also sets a shift position (forward, neutral, or backward) via a shift cable 8 by way of a shift link mechanism and a gear mechanism (neither is shown) in the outboard motor. An engine stop switch 9 is provided in the ship cockpit 5 and when the engine stop switch 9 is switched ON, an engine stop instruction is sent to the ECU 4.

A recoil starting device 10 that manually starts the engine 2 is attached to the outboard motor. The crankshaft 11 is rotated by manually pulling the recoil starting device 10, so that the engine 2 equipped with neither a battery nor starter can be started.

A configuration of a fuel injection control device of the engine 2 of the first embodiment will now be described in detail using FIG. 2. Air taken in from an intake pipe 20 flows into an intake manifold 22 while a flow rate is adjusted via a throttle valve 21, which is an intake metering valve. Injectors 23 are installed immediately before combustion chambers of the intake manifold 22 and eject gasoline fuel.

The intake air is mixed with the ejected gasoline fuel and forms an air-fuel mixture, which flows into the respective cylinder combustion chambers and is ignited by spark plugs 24 to burn. An emission gas after combustion flows through an exhaust manifold 25 and is discharged to the outside of the engine 2.

A throttle opening sensor 31 as an idle operation state detection portion that detects an idle operation state of the engine 2 is connected to the throttle valve 21 and outputs a signal in proportion to the throttle opening to the ECU 4 using a signal line a. The ECU 4 determines whether the throttle valve 21 is fully closed on the basis of the throttle opening signal and detects that the engine 2 is in an idle state.

An absolute pressure sensor 32 as an intake pressure detection portion that detects an intake pressure of the engine 2 is installed downstream of the throttle valve 21, and outputs a signal corresponding to an intake pipe absolute pressure PB (engine load) to the ECU 4 using a signal line b. Also, an intake temperature sensor 33 is installed upstream of the throttle valve 21 and outputs a signal in proportion to an intake air temperature AT to the ECU 4 using a signal line c.

An overheat sensor 34 is provided to the exhaust manifold 25 and outputs a signal in proportion to an engine exhaust temperature to the ECU 4 using a signal line d. A wall temperature sensor 35 as an engine temperature detection portion that detects a warm-up operation of the engine 2 is installed at an appropriate position on a nearby cylinder block, and outputs a signal in proportion to an engine cooling wall temperature WT to the ECU 4 using a signal line e.

An ISC (Idle Speed Control) valve 26 controls an amount of air to hold an idle state during the idle operation. In a case where an amount of air needs to be increased, a space 27 is increased by moving the ISO valve 26 in a direction to contract by an instruction to reduce the number of STEPs, so that an amount of air flowing in is increased. On the other hand, in a case where an amount of air needs to be reduced, the space 27 is filled with the ISO valve 26 by moving the ISC valve 26 in a direction to expand by an instruction to increase the number of STEPs, so that an amount of air flowing in is reduced. The idle state is maintained in this manner.

A shift position sensor (not shown) as a load detection portion that detects whether the shift position state of the engine 2 is neutral, forward, or backward is installed inside a gearbox 36 in the vicinity of the shift link mechanism, and outputs a signal corresponding to the operated shift position (forward, neutral, or backward) to the ECU 4 using a signal line f. The ECU 4 detects an engine load on the basis of this signal.

A crank angle sensor 37 functioning as an engine speed detection portion that detects an operation state of the engine 2 is installed in the vicinity of a flywheel 28 attached via the crankshaft 11, and outputs a crank angle signal to the ECU 4 using a signal line g. The ECU 4 calculates an engine rotation speed (engine speed NE) on the basis of this crank angle signal. Further, the engine stop switch 9 provided to the ship cockpit 5 switches ON when the ship driver makes an engine stop request, and outputs an ON signal to the ECU 4 using a signal line h.

An operation of the fuel injection control device of the engine 2 of the first embodiment will now be described using FIG. 1 and FIG. 2. The crankshaft 11 is rotated by manually pulling the recoil starting device 10 and a generator 12 driven by the rotation of the crankshaft 11 generates power. The generated power is supplied to the injectors 23, the spark plugs 24, and the ISC valve 26 via the ECU 4.

The ECU 4 starts the engine 2 in a stable manner by driving the injectors 23, the spark plugs 24, and the ISC valve 26 on the basis of an amount of fuel supply, spark timing, and an amount of required air computed in advance. When the engine 2 is stopped, the injectors 23 and the spark plugs 24 are stopped by switching ON the engine stop switch 9. The crankshaft 11 thus stops rotating, which stops the generator 12 generating power and hence the ECU 4.

Figure 3:
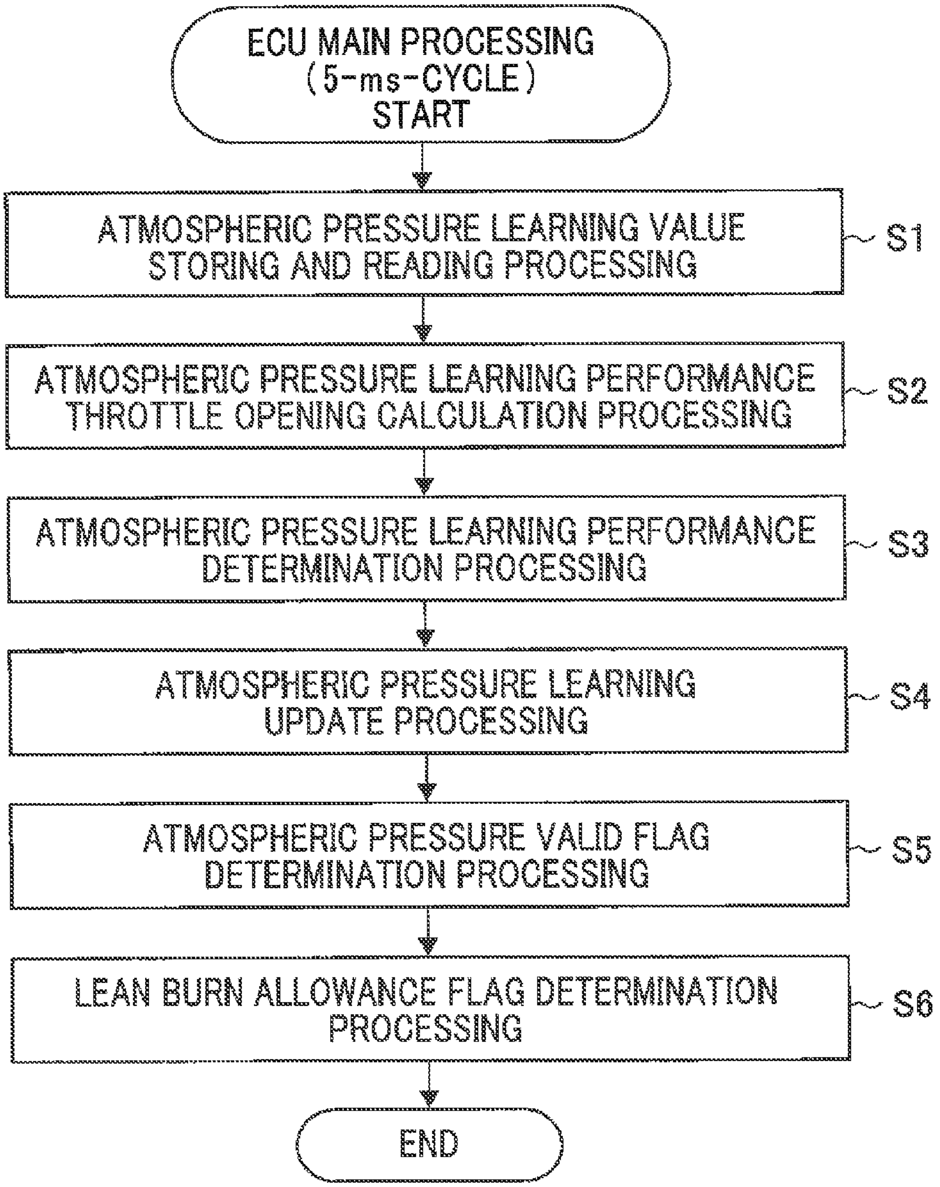
FIG. 3 is a view depicting an overall flow of atmospheric pressure estimation processing and lean burn control inhibition processing in ECU main control processing according to the first embodiment of the invention.

The main control processing by the ECU 4 in the atmosphere pressure estimation device, that is, atmospheric pressure estimation processing and lean burn control inhibition processing, will now be described using FIG. 3. FIG. 3 is a flowchart depicting an overall flow of the atmospheric pressure estimation processing and lean burn allowance flag determination processing in the ECU main control processing. The ECU main control processing is performed at arbitrary predetermined intervals, for example, every 5 ms.

As is shown in FIG. 3, the ECU 4 performs processing in Step 1 through Step 5 as the atmospheric pressure estimation processing and performs the lean burn allowance flag determination processing in Step 6. The processing in each step will be described in detail below using FIG. 4 through FIG. 12.

Referring to FIG. 3, in Step 1 (S1), the ECU 4 performs atmospheric pressure learning value storing and reading processing including processing to store an atmospheric pressure learning value before the engine stop into an EEPROM, which is an internal memory device of the ECU 4, and processing to read out a parameter value or the last atmospheric pressure learning value from the EEPROM to be used as an initial atmospheric pressure value at the engine start. In Step 2 (S2), the ECU 4 performs atmospheric pressure learning performance throttle opening calculation processing to calculate throttle opening at which the atmospheric pressure learning is performed.

In subsequent Step 3 (S3), the ECU 4 performs atmospheric pressure learning performance determination processing to determine whether the atmospheric pressure learning is to be performed or stopped. In Step 4 (S4), the ECU 4 performs atmospheric pressure learning update processing to update the atmospheric pressure learning value when the learning performance conditions are satisfied in S3.

In subsequent Step 5 (S5), the ECU 4 performs atmospheric pressure valid flag determination processing to determine whether the updated atmospheric pressure learning value is valid or invalid. Further, in Step 6 (S6), the ECU 4 performs the lean burn allowance flag determination processing to determine whether learn burn control is allowed or not according to a validity determination of the atmospheric pressure learning value in S5.

The atmospheric pressure learning value storing and reading processing in S1 of FIG. 3 will now be described. In the case of a manual-starting engine unequipped with a battery, so-called an engine stall state does not occur and an intake pressure value when the ECU 4 is activated is unstable and different from an actual atmospheric pressure value. Hence the atmospheric pressure estimation device of the first embodiment does not perform learning processing of an estimated atmospheric pressure using an intake pressure value at the engine start in order to prevent erroneous learning. Herein, a pre-set parameter value or the last atmospheric pressure learning value is used as an initial atmospheric pressure value at the engine start.

At the first engine start, that is, when the ECU 4 is activated for the first time, a pre-set parameter value is used as the initial atmospheric pressure value because the last atmospheric pressure learning value is not saved in the EEPROM. The atmospheric pressure learning value is constantly updated while the engine is in operation in an atmospheric pressure learning region. The atmospheric pressure learning value before the engine stop is stored in the EEPROM and used as the initial atmospheric pressure value when the ECU 4 is activated next time.

Figure 4:
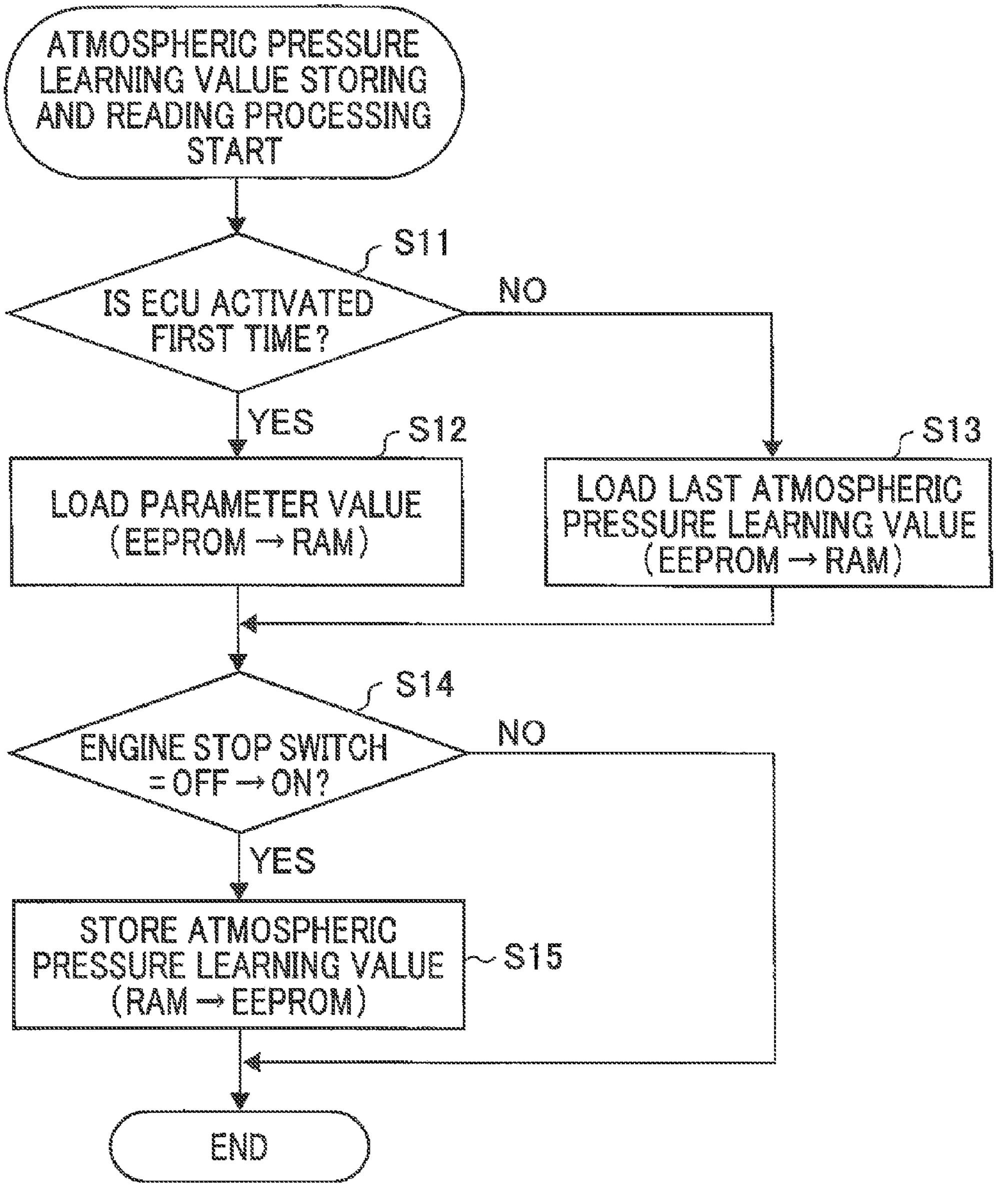
FIG. 4 is a view depicting a flow of atmospheric pressure learning value storing and reading processing in the atmospheric pressure estimation device according to the first embodiment of the invention.

FIG. 4 is a flowchart depicting a flow of the atmospheric pressure learning value storing and reading processing. In Step 11 (S11), the ECU 4 determines whether the ECU 4 is activated for the first time. When the ECU 4 is activated for the first time (YES), advancement is made to Step 12 (S12). Otherwise (NO), advancement is made to Step 13 (S13).

In S12, because this is the first activation, the ECU reads out the pre-set parameter value as the initial atmospheric pressure value from the EEPROM and inputs the read value into a control RAM, after which advancement is made to Step 14 (S14). In S13, because this is not the first activation, the ECU 4 reads out the last atmospheric pressure learning value stored in the EEPROM and inputs the read value into the control RAM, after which advancement is made to S14.

In S14, the ECU 4 determines whether the engine stop switch 9 is switched ON from OFF. When the engine stop switch 9 is switched ON (YES), advancement is made to Step 15 (S15), and when the engine stop switch 9 is not switched ON (NO), this processing is ended. In S15, the ECU 4 stores the atmospheric pressure learning value stored in the control RAM into the EEPROM. The atmospheric pressure learning value stored at this point is used as the initial atmospheric pressure value next time.

By performing the processing as above, for example, in a case where the engine 2 is used when the small boat is carried in a lake or the like 0 to several thousand meters above the sea level or in a reverse situation, the parameter value or the last atmospheric pressure learning value is used as the initial atmospheric pressure value until the atmospheric pressure learning value is updated. However, once the engine 2 is operated and the learning is performed, it becomes possible to use a highly reliable control parameter as soon as the engine 2 is started under an atmospheric pressure at the same level.

The atmospheric pressure learning performance throttle opening calculation processing in S2 of FIG. 3 will now be described. Herein, a throttle full-open value at every engine rotation speed calculated from the rotation speed of the engine 2 is matched using an intake pressure and the matched value is set in a throttle full-open map.

Figure 5:
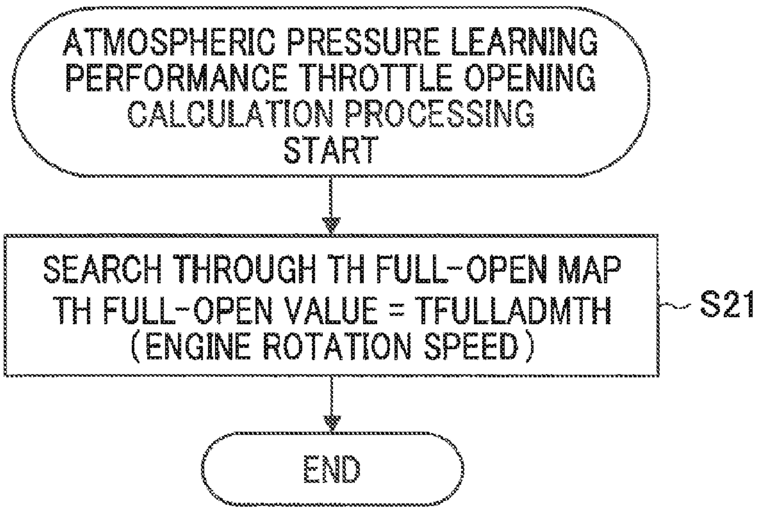
FIG. 5 is a view depicting a flow of throttle opening calculation processing to calculate throttle opening at which atmospheric pressure learning is performed in the atmospheric pressure estimation device according to the first embodiment of the invention.

FIG. 5 is a flowchart depicting a flow of the atmospheric pressure learning performance throttle opening calculation processing. In Step 21 (S21), a search is conducted through the throttle full-open map (hereinafter, referred to as the TH full-open map) to set the TH full-open value, after which this processing is ended.

Figure 6:
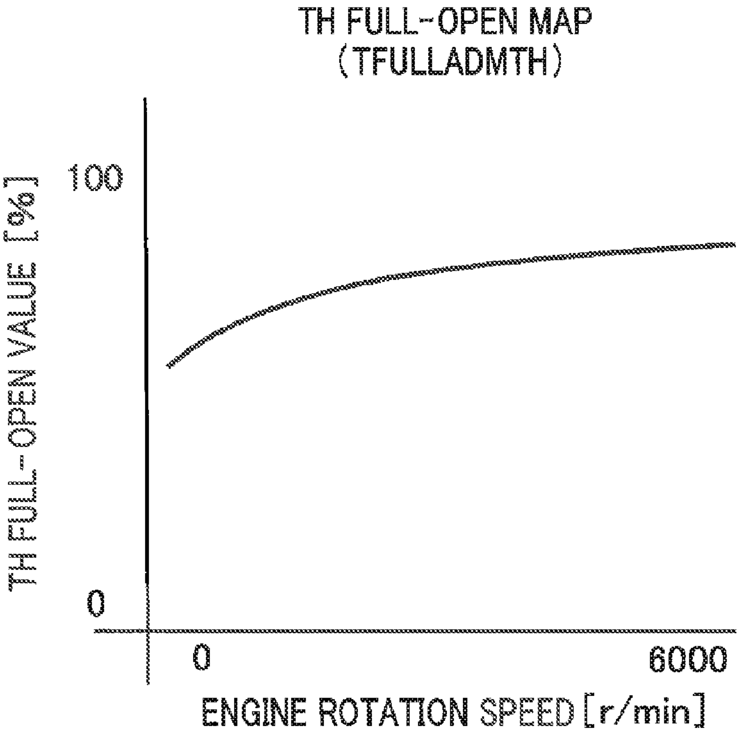
FIG. 6 is a view showing an example of a throttle full-open map in the atmospheric pressure estimation device according to the first embodiment of the invention.

FIG. 6 shows the TH full-open map (TFULLADMTH). The TH full-open map is formed of a two-dimensional map with the engine rotation speed. More specifically, the engine rotation speed is fixed at every arbitrary engine rotation speed and a throttle opening at which an intake pressure value reaches the upper limit (approximates to the atmospheric pressure) set. In a case where there is a region in which the intake pressure value does not approximate to the atmospheric pressure due to a low rotation speed, the upper limit value of the throttle opening is set and the learning is inhibited.

The atmospheric pressure learning performance determination processing in S3 of FIG. 3 will now be described. Herein, an atmospheric pressure learning region is determined using the TH full-open value found from the TH full-open map in S2 described above and the actual throttle value. In the first embodiment, a region in which the throttle opening is equal to or greater than the TH full-open value is defined as the atmospheric pressure learning region. The atmospheric pressure learning region is a region in which the conditions under which to perform the atmospheric pressure learning are satisfied. In this region, the atmospheric pressure learning performance flag is set.

Figure 7:
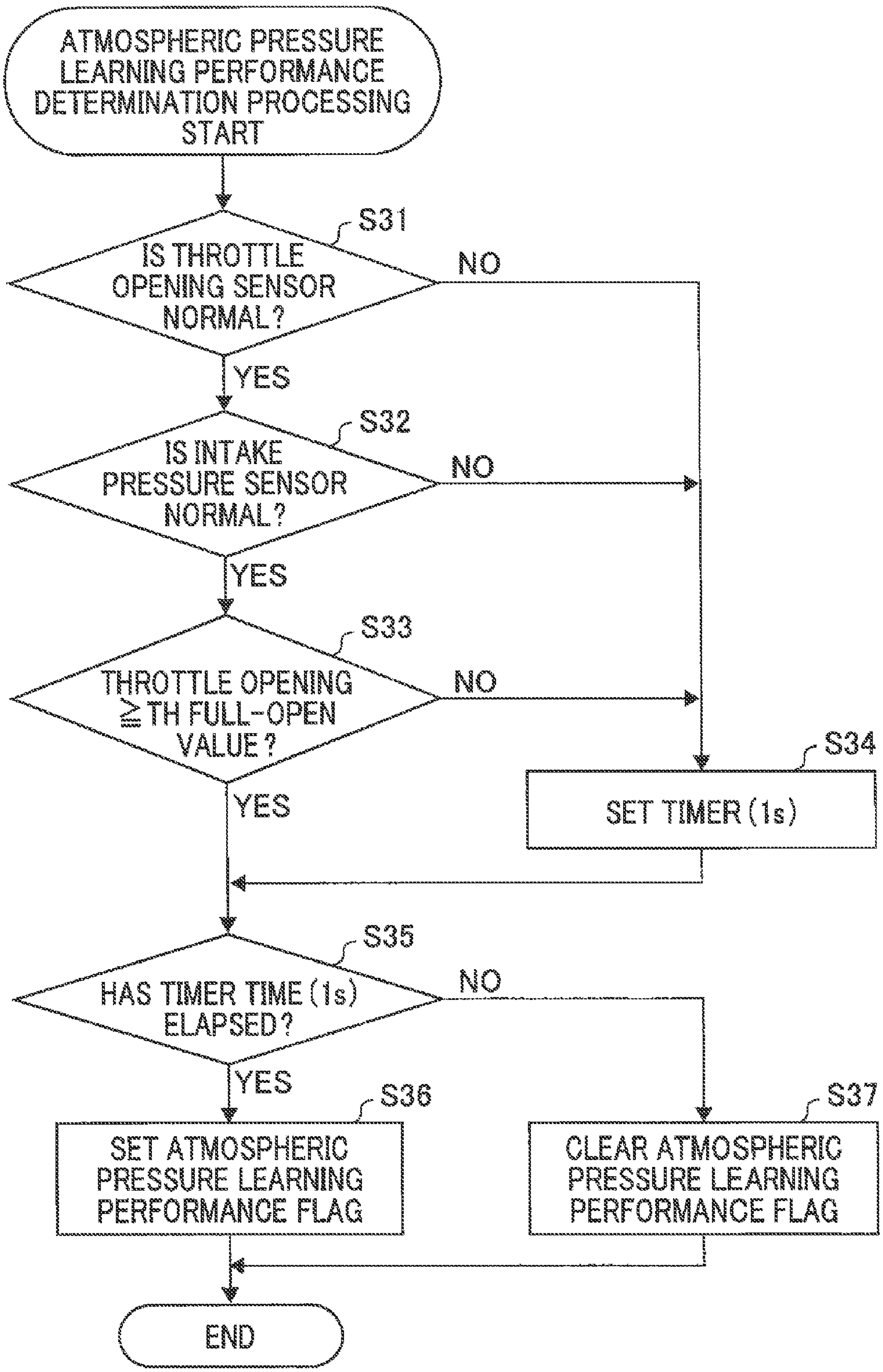
FIG. 7 is a view depicting a flow of processing to determine whether the atmospheric pressure learning is to be performed or not in the atmospheric pressure estimation device according to the first embodiment of the invention.

FIG. 7 is a flowchart depicting a flow of the atmospheric pressure learning performance determination processing. In Step 31 (S31), the ECU 4 determines whether the throttle opening sensor 31 has a failure or not. When the throttle opening sensor 31 is normal (YES), advancement is made to Step 32 (S32). When the throttle opening sensor 31 is not normal (NO), that is, when the throttle opening sensor 31 has a failure, advancement is made to Step 34 (S34).

In S32, the ECU 4 determines whether the intake pressure sensor, that is, the absolute pressure sensor 32 has a failure. When the absolute pressure sensor 32 is normal (YES), advancement is made to Step 33 (S33). When the absolute pressure sensor 32 has a failure (NO), advancement is made to S34. In S33, the ECU 4 compares the TH full-open value set in S21 of FIG. 5 with the actual throttle opening. When the comparison result reads, throttle opening≥TH full-open value (YES), advancement is made to Step 35 (S35).

On the other hand, when the comparison result in S33 reads, throttle opening<TH full-open value (NO), advancement is made to S34. In S34, because the atmospheric pressure learning performance conditions are not satisfied, a determination timer is set. As a determination timer time, an arbitrary value (for example, 1 s) with which erroneous learning is not performed in response to an abrupt change of the throttle opening is set.

In S35, the ECU 4 determines whether the timer time has elapsed or not. When the timer time has elapsed (YES) advancement is made to Step 36 (S36). Otherwise (NO), advancement is made to Step S37 (S37). In S36, the ECU 4 sets the atmospheric pressure learning performance flag because the atmospheric pressure learning conditions are satisfied. In S37, the ECU 4 clears the atmospheric pressure learning performance flag, because the atmospheric pressure learning conditions are not satisfied.

The atmospheric pressure learning value update processing in S4 of FIG. 3 will now be described. In a case where it is determined that the engine 2 is in the atmospheric pressure learning region, that is, when the atmospheric pressure learning performance flag is set, the ECU 4 obtains the atmospheric pressure learning value by applying the filtering to the estimated atmospheric pressure. This atmospheric, pressure learning value is updated at arbitrary predetermined intervals. Herein, the arbitrary predetermined intervals are substantially equal to the intervals of the ECU main processing, for example, 5 ms. Hence, it can be said that the atmospheric pressure learning value is constantly updated while the engine 2 is in normal operation.

Figure 8:
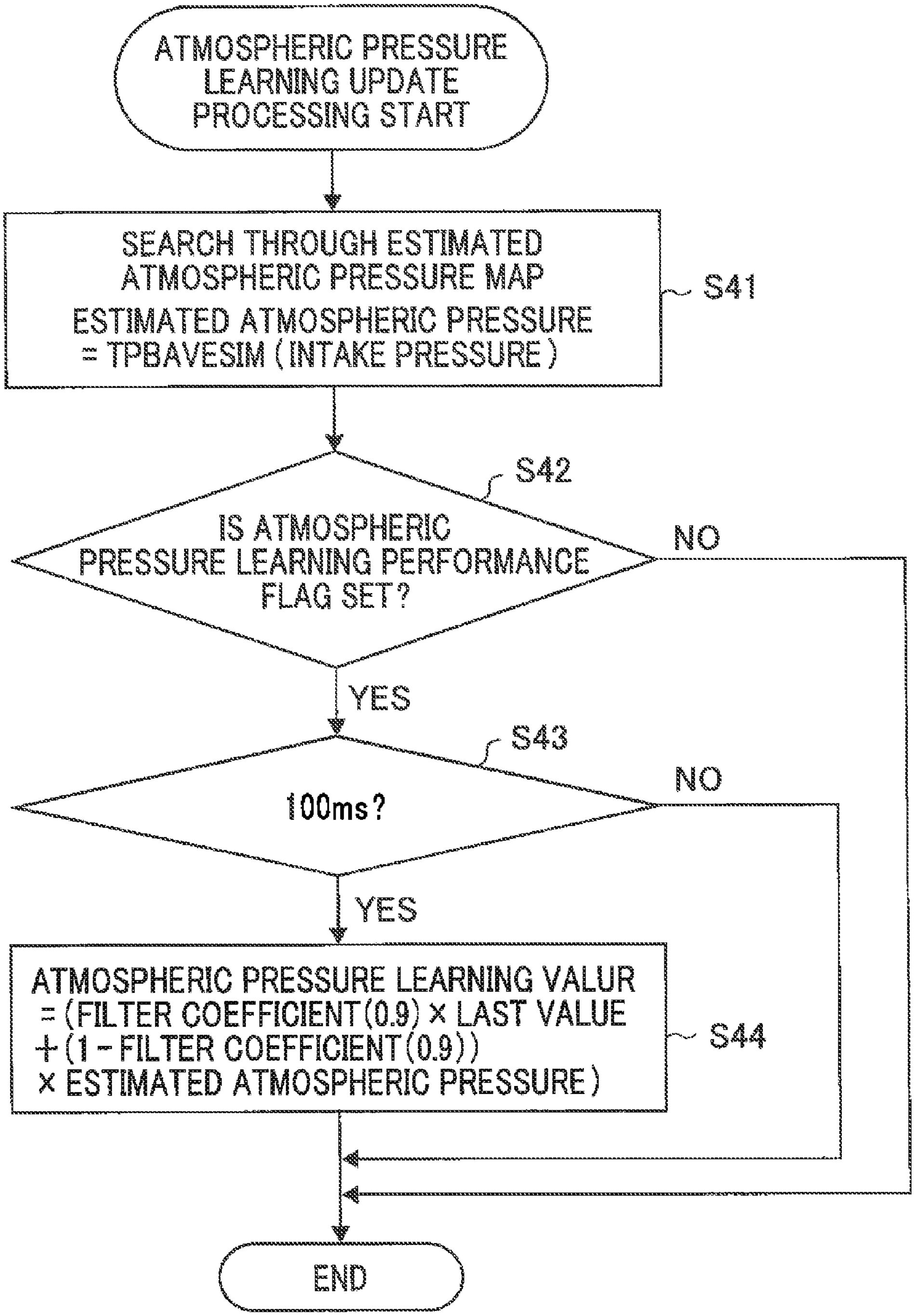
FIG. 8 is a view depicting a flow of processing to update the atmospheric pressure learning value in the atmospheric pressure estimation device according to the first embodiment of the invention.

FIG. 8 is a flowchart depicting a flow of the atmospheric pressure learning value update processing. In Step 41 (S41), the ECU 4 sets an estimated atmospheric pressure by conducting a search through the estimated atmospheric pressure map. The ECU 4 has the estimated atmospheric pressure map of estimated atmospheric pressure values matched in advance to an average intake pressure. More specifically, the estimated atmospheric pressures are matched using the average intake pressure calculated using an output signal from the absolute pressure sensor 32 and the matched values are set in the estimated atmospheric pressure map.

In subsequent Step 42 (S42), the ECU 4 makes a determination as to the atmospheric pressure learning performance flag. That is, when the atmospheric pressure learning performance flag is set (YES), advancement is made to Step 43 (S43). When the atmospheric pressure learning performance flag is not set (NO), this processing is ended. The atmospheric pressure learning performance flag is set in S36 in the flowchart of FIG. 7.

In S43, the ECU 43 determines whether 100 ms have elapsed or not in order to make the filtering in the following step more stable. When 100 ms have elapsed (YES), advancement is made to Step 44 (S44). In a case where the filtering is not stabilized after 100 ms have elapsed, a time is adjusted further.

In S44, the ECU 4 obtains an atmospheric pressure learning value by applying the filtering to the estimated atmospheric pressure obtained in S41. An equation below is used as the filtering performed herein:

atmospheric pressure learning value filter coefficient× last value+(1−filter coefficient)×estimated atmospheric pressure.

Herein, the filter coefficient is set between 0 and 1.0 by confirming a behavior in actual use from time to time.

Figure 9:
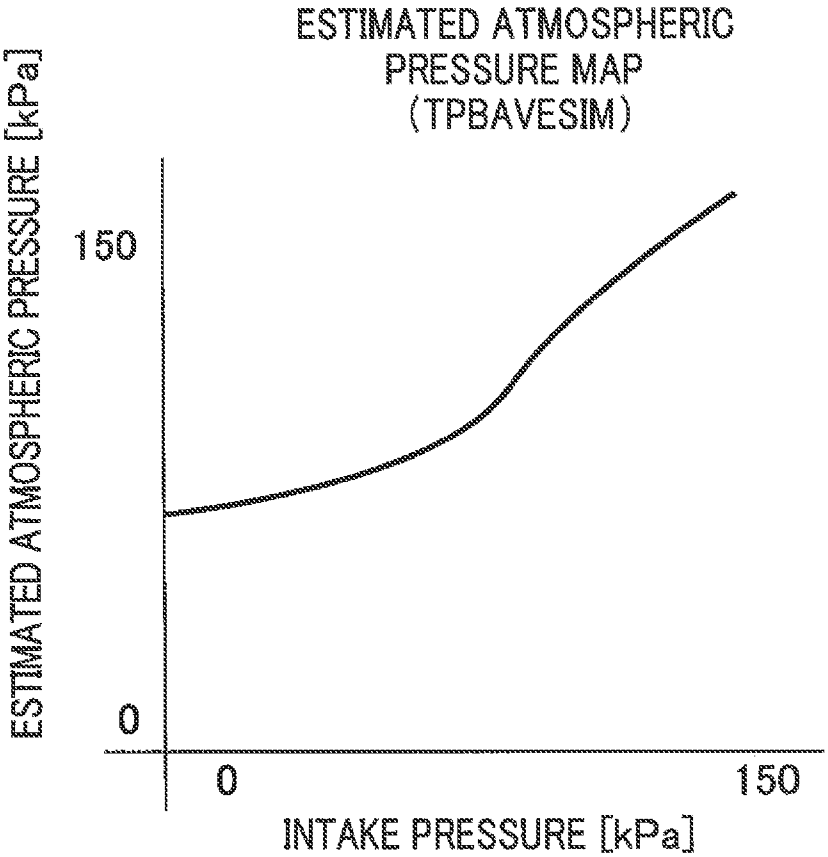
FIG. 9 is a view showing an example of an estimated atmospheric pressure map in the atmospheric pressure estimation device according to the first embodiment of the invention.

FIG. 9 shows an estimated atmospheric pressure map (TPBAVESIM). The estimated atmospheric pressure map is formed of a two-dimensional map with an intake pressure. The absolute pressure sensor 32 is installed downstream of the throttle valve 21, and the detected intake pressure has a deviation from the original atmospheric pressure due to a loss in the intake passage or the like. In order to correct this deviation, an estimated atmospheric pressure value is set at every arbitrary intake pressure.

The atmospheric pressure valid flag determination processing in S5 of FIG. 3 will now be described. There is a case where the atmospheric pressure while the engine is in operation varies considerably between the values of this time and the last time due to a change in weather when the power supply is turned OFF or a change of location of use. Hence, when the atmospheric pressure learning performance flag is set (when the atmospheric pressure learning value is updated at least once after the ECU 4 is activated) the ECU 4 performs the atmospheric pressure valid flag determination processing to determine whether the updated atmospheric pressure learning value is valid or invalid, it should be noted that once the atmospheric pressure valid flag is set, the atmospheric pressure valid flag is kept set while the ECU 4 is activated.

Figure 10:
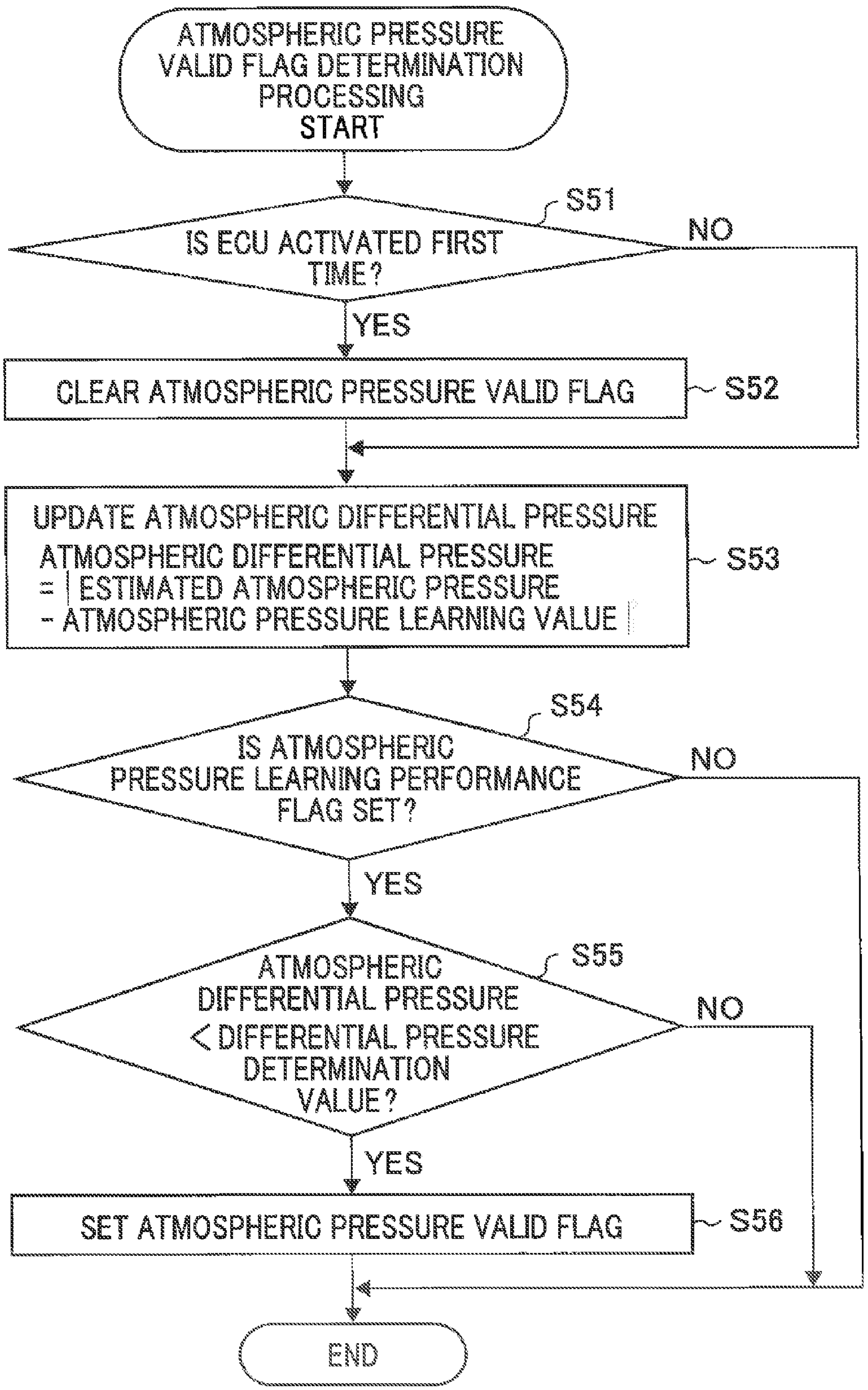
FIG. 10 is a view depicting a flow of processing to determine whether the atmospheric pressure learning value is valid or not in the atmospheric pressure estimation device according to the first embodiment of the invention.

FIG. 10 is a flowchart depicting a flow of the atmospheric pressure valid flag determination processing. In Step 51 (S51), the ECU 4 determines whether the ECU 4 is activated for the first time. When the ECU 4 is activated for the first time (YES), advancement is made to Step 52 (S52). Otherwise (NO), advancement is made to Step 53 (S53) In S52, the ECU 4 clears the atmospheric pressure valid flag because the ECU 4 is activated for the first time, after which advancement is made to S53.

In S53, the ECU 4 makes an update by finding an atmospheric differential pressure, which is an absolute value of difference between the estimated atmospheric pressure (map value) set with respect to the average intake pressure using the estimated atmospheric pressure map and the initial atmospheric pressure value or the atmospheric pressure learning value used currently. In Subsequent Step 54 (S54), the ECU 4 makes a determination as to the atmospheric pressure learning performance flag. When the atmospheric pressure learning performance flag is set (YES), advancement is made to Step 55 (S55). When the atmospheric pressure learning performance flag is not set (NO), this processing is ended.

In S55, the ECU 4 compares a differential pressure determination value set in advance for an atmospheric pressure validity determination with the atmospheric differential pressure updated in S53. As the differential pressure determination value, a value with which the drivability of the outboard motor is not deteriorated is set by confirming a behavior in actual use from time to time. When the comparison result reads, atmospheric differential pressure<differential pressure determination value (YES), advancement is made to Step 56 (S56). Otherwise, that is, when the comparative result reads, atmospheric differential pressure≥differential pressure determination value (NO), this processing is ended. In S56, the ECU 4 sets the atmospheric pressure valid flag, after which the processing is ended.

The lean burn allowance flag determination processing in S6 of FIG. 3 will now be described. In a case where there is a large difference between the estimated atmospheric pressure (map value) and the initial atmospheric pressure value or the atmospheric pressure learning value used for the control after the engine 2 is started, when the mode is changed to another mode, such as lean burn control relating to the fuel control, in this state, the control considerably differs from the actually necessary fuel control and the drivability may possibly be deteriorated extremely.

In order to overcome this inconvenience, in the first embodiment, a change to the lean burn control is allowed only in a case where the atmospheric differential pressure, which the absolute value of a difference between the estimated atmospheric pressure and the initial atmospheric pressure value or the atmospheric pressure learning value used currently is smaller than the pre-set differential pressure determination value, that is, when the atmospheric pressure valid flag is set, and a change to the lean burn control is inhibited when the atmospheric pressure valid flag is not set.

Figure 11:
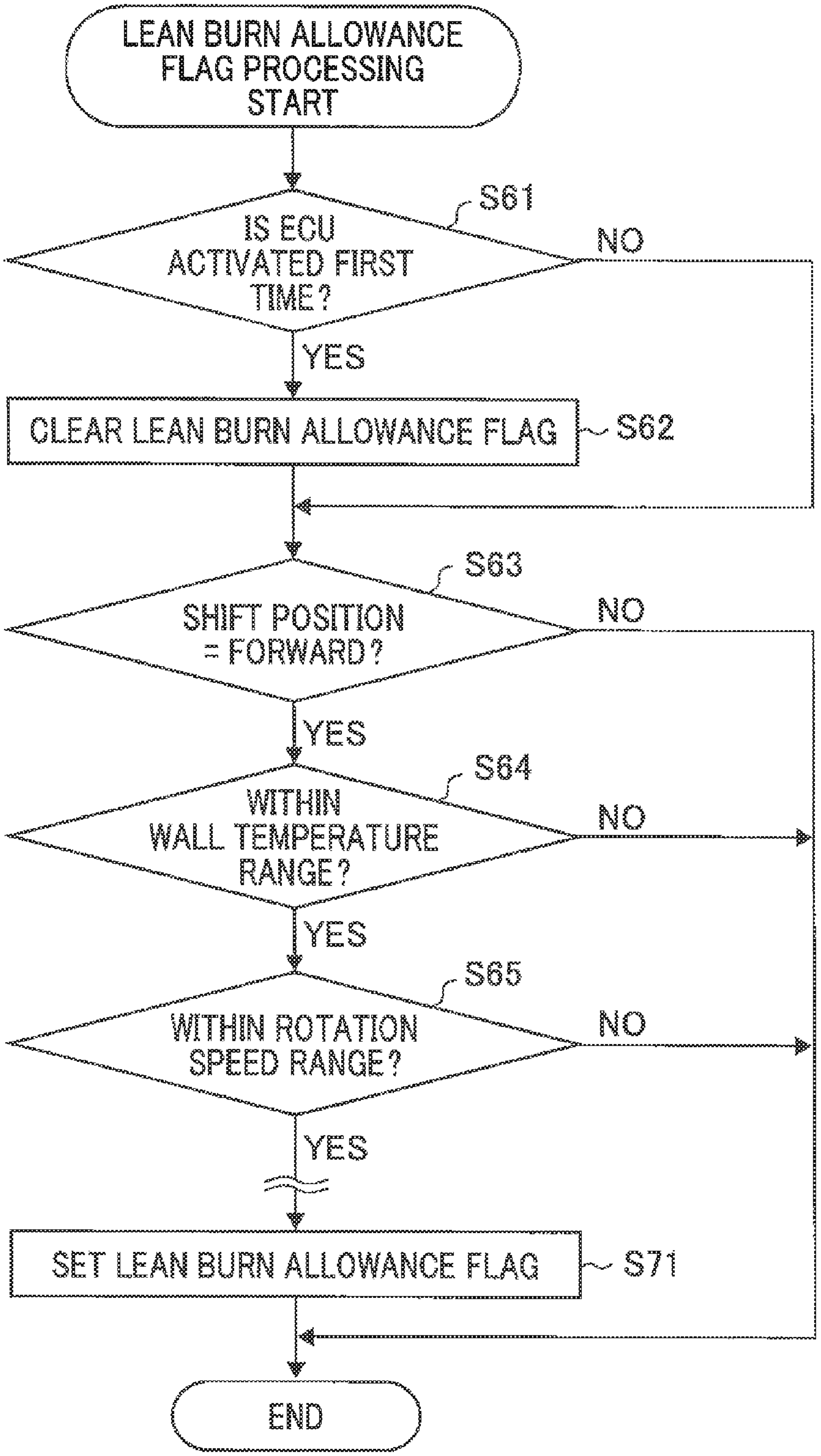
FIG. 11 is a view depicting a flow of the processing to determine whether lean burn control is allowed or not in the atmospheric pressure estimation device according to the first embodiment invention.
Figure 12:
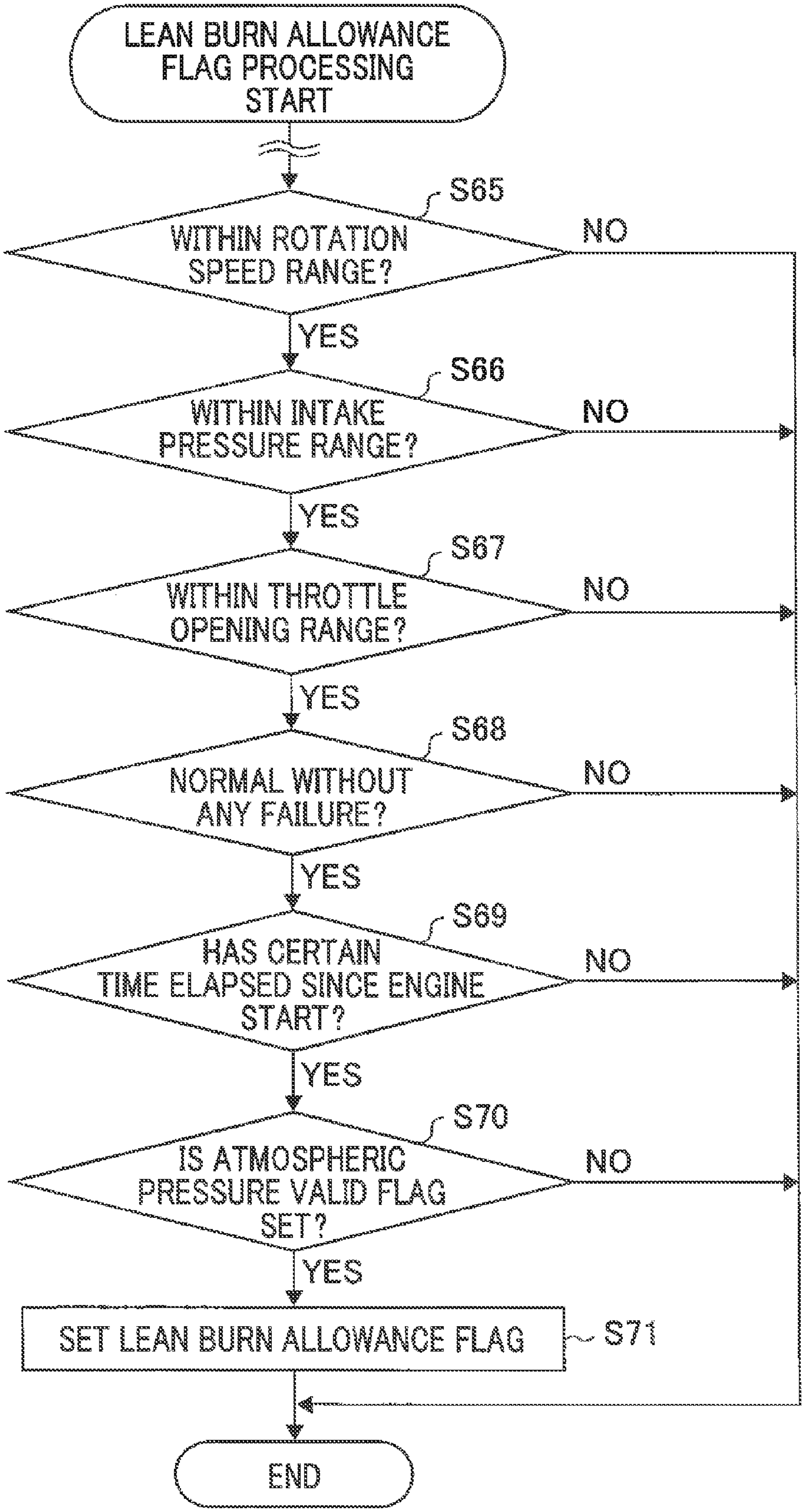
FIG. 12 is a view depicting the flow of the processing to determine whether the lean burn control is allowed or not in the atmospheric pressure estimation device according to the first embodiment invention.

FIG. 11 and FIG. 12 show a flowchart depicting a flow of the lean burn allowance flag determination processing. The flowchart is divided to two parts because of the sheet size. FIG. 11 and FIG. 12, however, show one continuous flowchart.

In Step 61 (S61) of FIG. 11, the ECU 4 determines whether the ECU 4 is activated for the first time. When the ECU 4 is activated for the first time (YES) advancement is made to Step 62 (S62). Otherwise (NO), advancement is made to Step 63 (S63). In S62, the ECU 4 clears the lean burn allowance flag because the ECU 4 is activated for the first time, after which advancement is made to S63. In S63, the ECU 4 makes a shift position determination. When the shift position is forward (YES), advancement is made to Step 64 (S64). When the shift position is other than forward (NO), the processing is ended.

In S64, the ECU 4 makes a cylinder wall temperature determination. When the temperature is within a set range (YES), advancement is made to Step 65 (S65). When the temperature is out of the set range (NO), the processing is ended. In S65, the ECU 4 makes an engine speed determination. When the engine rotation speed is within a set range (YES), advancement is made to Step 66 (S66) of FIG. 12. When the engine rotation speed is out of the set range (NO), the processing is ended.

In S66, the ECU 4 makes an intake pressure determination. When the intake pressure is within a set range (YES) advancement is made to Step 67 (S67). When the intake pressure is out of the set range (NO) the processing is ended. In S67, the ECU 4 makes a throttle opening determination. When the throttle opening is within a set range (YES), advancement is made to Step 68 (S68). When the throttle opening is out of the set range (NO), the processing is ended.

In S68, the ECU 4 makes a total failure determination. When the engine 2 is normal without any failure (YES), advancement is made to Step 69 (S69). When there is even one failure (NO), the processing is ended. In S69, the ECU 4 makes a post-engine-start determination. When a predetermined certain time has elapsed since the engine start (YES), advancement is made to Step 70 (S70). When the certain time has not elapsed yet (NO), the processing is ended.

In S70, the ECU 4 makes an atmospheric pressure validity determination. When the atmospheric pressure valid flag is set (YES), advancement is made to Step 71 (S71). When the atmospheric pressure valid flag is not set (NO), the processing is ended. In S71, the ECU 4 sets the lean burn allowance flag, because all the lean burn control allowance conditions are satisfied.

Once the lean burn allowance flag is set, the lean burn allowance flag is kept set while the ECU 4 is activated. In the first embodiment, the lean burn control allowance conditions include a reference to the atmospheric pressure valid flag. Likewise, a reference to the atmospheric pressure valid flag may be added for other types of control under which the drivability may possibly be deteriorated depending on an atmospheric pressure state.

As has been described, according to the first embodiment, in the outboard motor unequipped with a battery and configured to start the engine 2 by manually rotating the crankshaft 11, even when inputs and outputs of the engine 2 are fewer, the atmospheric pressure learning value is obtained by applying filtering to the estimated atmospheric pressure found from the estimated atmospheric pressure map in the atmospheric pressure learning region matched in advance. By constantly updating this atmospheric pressure learning value, stable and highly reliable atmospheric pressure estimation can be achieved.

Also, the pre-set parameter value or the last atmospheric pressure learning value is used as the initial atmospheric pressure value and an unstable intake pressure value at the engine start in a battery-less state is not used. Hence, it becomes possible to provide an estimated atmospheric pressure with which high drivability is achievable by fully exploiting the performance of the engine 2 as soon as it is started.

Various modifications and alterations of this invention will be apparent to those skilled in the art without departing from the scope and spirit of this invention, and it should be understood that this is not limited to the illustrative embodiments set forth herein.

What is claimed is:

1. An atmospheric pressure estimation device of an outboard motor unequipped with a battery and configured to start an engine by manually rotating a crankshaft, comprising:

an electronic control unit that controls the engine;

an operation state detection portion that detects an operation state of the engine;

an intake pressure detection portion that detects an intake pressure of the engine; and a throttle opening detection portion that detects opening of an intake metering valve of the engine, wherein the electronic control unit performs:

processing to match a throttle full-open value at every engine rotation speed calculated from a rotation speed of the engine using the intake pressure and set the matched value in a throttle full-open map;

processing to determine an atmospheric pressure learning region on the basis of the throttle full-open value found from the throttle full-open map and a value of actual throttle opening;

processing to match an estimated atmospheric pressure using an average intake pressure calculated by the intake pressure detection portion and set the matched value in an estimated atmospheric pressure map; and processing to obtain an atmospheric pressure learning value by applying filtering to the estimated atmospheric pressure found from the estimated atmospheric pressure map in the atmospheric pressure learning region and update the atmospheric pressure learning value at predetermined intervals.

2. The atmospheric pressure estimation device of an outboard motor according to claim 1, wherein:

the electronic control unit uses a pre-set parameter value as an initial atmospheric pressure value when the electronic control unit is activated for a first time.

3. The atmospheric pressure estimation device of an outboard motor according to claim 1, wherein:

the electronic control unit stores an atmospheric pressure learning value before the engine is stopped and uses the stored atmospheric pressure learning value as an initial atmospheric pressure value when the electronic control unit is activated next time.

4. The atmospheric pressure estimation device of an outboard motor according to claim 2, wherein:

the electronic control unit stores an atmospheric pressure learning value before the engine is stopped and uses the stored atmospheric pressure learning value as an initial atmospheric pressure value when the electronic control unit is activated next time.

5. The atmospheric pressure estimation device of an outboard motor according to claim 1, wherein:

the electronic control unit determines the engine is in an atmospheric pressure learning region when a value of the actual throttle opening is equal to or greater than the throttle full-open value found from the throttle full-open map and performs atmospheric pressure learning.

6. The atmospheric pressure estimation device of an outboard motor according to claim 4, wherein:

the electronic control unit determines the engine is in an atmospheric pressure learning region when a value of the actual throttle opening is equal to or greater than the throttle full-open value found from the throttle full-open map and performs atmospheric pressure learning.

7. The atmospheric pressure estimation device of an outboard motor according to claim 1, wherein:

the electronic control unit finds an atmospheric differential pressure, which is an absolute value of a difference between an estimated atmospheric pressure set with respect to the average intake pressure from the estimated atmospheric pressure map and one of an initial atmospheric pressure and the atmospheric pressure learning value used currently, and determines that the estimated atmospheric pressure is valid when the atmospheric differential pressure is smaller than a pre-set differential pressure determination value.

8. The atmospheric pressure estimation device of an outboard motor according to claim 7, wherein:

the electronic control unit inhibits a change to lean burn control of the engine when it is determined that the estimated atmospheric pressure is invalid.

9. The atmospheric pressure estimation device of outboard motor according to claim 4, wherein:

the electronic control unit finds an atmospheric differential pressure, which is an absolute value of a difference between an estimated atmospheric pressure set with respect to the average intake pressure from the estimated atmospheric pressure map and one of an initial atmospheric pressure and the atmospheric pressure learning value used currently, and determines that the estimated atmospheric pressure is valid when the atmospheric differential pressure is smaller than a pre-set differential pressure determination value.

10. The atmospheric pressure estimation device of an outboard motor according to claim 9, wherein:

the electronic control unit inhibits a change to lean burn control of the engine when it is determined that the estimated atmospheric pressure is invalid.

11. The atmospheric pressure estimation device of an outboard motor according to claim 5, wherein:

the electronic control unit finds an atmospheric differential pressure, which is an absolute value of a difference between an estimated atmospheric pressure set with respect to the average intake pressure from the estimated atmospheric pressure map and one of an initial atmospheric pressure and the atmospheric pressure learning value used currently, and determines that the estimated atmospheric pressure is valid when the atmospheric differential pressure is smaller than a pre-set differential pressure determination value.

12. The atmospheric pressure estimation device of an outboard motor according to claim wherein:

the electronic control unit inhibits a change to lean burn control of the engine when it is determined that the estimated atmospheric pressure is invalid.

* * * * *

UNITED STATES PATENT AND TRADEMARK OFFICE

CERTIFICATE OF CORRECTION

PATENT NO. : 9,067,662 B2
APPLICATION NO. : 14/149920
DATED : June 30, 2015
INVENTOR(S) : Hitoshi Sako and Yohei Yamaguchi It is certified that error appears in the above-identified patent and that said Letters Patent is hereby corrected as shown below:

In the Claims:

Please correct claim 12 as follows:

12. The atmospheric pressure estimation device of an outboard motor according to claim 11, wherein:

the electronic control unit inhibits a change to lean burn control of the engine when it is determined that the estimated atmospheric pressure is invalid.

Signed and Sealed this
Twentieth Day of October, 2015

Michelle K. Lee

Michelle K. Lee
*Director of the United States Patent and Trademark Office*